(12) United States Patent
Ruiz et al.

(10) Patent No.: US 8,727,288 B2
(45) Date of Patent: May 20, 2014

(54) SNAP-IN BRACKET FOR ATTACHING CABLING TO A SUPPORT

(75) Inventors: Gil Ruiz, McKinney, TX (US); Larry D. Ross, Princeton, TX (US); Craig B. Wilson, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 72 days.

(21) Appl. No.: 13/438,231

(22) Filed: Apr. 3, 2012

(65) Prior Publication Data

US 2013/0256471 A1    Oct. 3, 2013

(51) Int. Cl.
*F16L 3/08* (2006.01)
*F16L 3/00* (2006.01)
*F16L 3/02* (2006.01)
*F16L 3/13* (2006.01)

(52) U.S. Cl.
CPC .... F16L 3/00 (2013.01); *F16L 3/02* (2013.01); *F16L 3/13* (2013.01)
USPC .............................................. 248/65; 248/73

(58) Field of Classification Search
USPC .......... 248/58, 65, 68.1, 71, 231.9, 230.7, 73, 248/316.7; 439/470, 544, 492, 353, 258, 439/761, 765, 801, 455; 24/455, 527, 572.1
See application file for complete search history.

(56) References Cited

U.S. PATENT DOCUMENTS

| | | | |
|---|---|---|---|
| 3,430,904 A | 3/1969 | Soltysik | |
| 3,501,117 A | 3/1970 | Soltysik | |
| 4,023,758 A | 5/1977 | Yuda | |
| 4,025,142 A * | 5/1977 | Huber et al. | 439/470 |
| 4,241,972 A * | 12/1980 | Ayer | 439/544 |
| 4,334,659 A | 6/1982 | Yuda | |
| 5,314,149 A | 5/1994 | Pim | |
| 5,750,935 A | 5/1998 | Stevens | |
| 5,759,004 A | 6/1998 | Kuffel | |
| 5,961,081 A * | 10/1999 | Rinderer | 248/68.1 |
| 5,967,468 A | 10/1999 | Veghte | |
| 6,039,449 A | 3/2000 | Dolan | |
| 6,161,804 A | 12/2000 | Paske | |
| 6,494,412 B2 * | 12/2002 | Gombert | 248/65 |
| 6,565,048 B1 * | 5/2003 | Meyer | 248/58 |
| 7,090,174 B2 | 8/2006 | Korczak | |
| 7,523,897 B2 * | 4/2009 | Boltz et al. | 248/71 |
| 7,725,991 B2 | 6/2010 | Lubera | |
| 2005/0072746 A1 | 4/2005 | O'Brien | |

* cited by examiner

*Primary Examiner* — Tan Le
(74) *Attorney, Agent, or Firm* — Muncy, Geissler, Olds & Lowe, P.C.

(57) ABSTRACT

A bracket includes a base having a first face and a second face and at least one side edge between the first face and the second face and a connector configured to support a cable projecting from the base. At least one opening extends through the base, and the base includes a wall portion adjacent to the at least one opening. A clip includes a body and first and second legs projecting from the body, each of the first and second legs including a tab, the tab of the first leg projecting away from the tab of the second leg. The clip is mounted to the base with the first leg projecting through the at least one opening and the body overlying the wall portion.

16 Claims, 6 Drawing Sheets

SNAP-IN BRACKET FOR ATTACHING CABLING TO A SUPPORT

FIELD OF THE INVENTION

The present invention is directed toward a snap-in bracket for attaching a cable or cable bundle to a support such an equipment enclosure or a rack, and, more specifically, toward a snap-in bracket having a base, a connector configured to hold a cable or cable bundle, and at least one leg projecting from the base and having a tab configured to engage a portion of the support to secure the bracket to the support.

BACKGROUND OF THE INVENTION

Electronic and/or communications equipment is conventionally mounted in racks, which may be formed, for example, of interconnected horizontal and vertical support members, some or all of which may have patterns of holes spaced at predetermined intervals. Depending on the type of equipment at issue, it may be necessary or desirable to support individual cables and/or bundles of cables on the rack so that these cables can be connected to the equipment in the rack. The cables may contain electrically conductive wires or optical fibers, and the use of the term "cable" herein is intended to include both of these materials. Brackets may therefore be mounted to either the rack or to the housings of the equipment mounted in the rack to hold the cables in a desired position, and conventionally, these brackets are connected to the rack using screws or similar fasteners.

These brackets may include a portion that can be attached to the rack or module and a portion with a holder configured for holding one or more cables. Especially in higher density applications, a relatively large number of brackets must be attached to each rack and/or each module in a rack, and attaching and removing such brackets can be time consuming when such process involves insertion or removal of screws. It would therefore be desirable to provide a bracket configured to secure cabling to a support which bracket can be installed without tools and that can be connected to a conventional support without modifying the support.

SUMMARY OF THE INVENTION

These problems and others are addressed by embodiments of the present invention, a first aspect of which comprises a bracket having a base having a first face and a second face and at least one side edge between the first face and the second face and a connector configured to support a cable projecting from the base. At least one opening extends through the base, and there is a wall portion adjacent the at least one opening. A clip is connected to the base and comprises a body and first and second legs projecting from the body, each of the first and second legs including a tab. The tab of the first leg projects away from the tab of the second leg, and the clip is mounted on the base with the first leg projecting through the at least one opening and the body overlying the wall portion.

Another aspect of the invention comprises a bracket having base means for overlying a first side of a mounting element of a support, the base means including a first face and a second face and at least one side edge between the first face and the second face, connector means for connecting a cable to the base means, and clip means for securing the base means to the mounting element.

A further aspect of the invention comprises a bracket having a base having a first face and a second face, a top edge, a bottom edge, a side edge and an opening. Exactly one connector projects from the base at a junction and has an aperture configured to support a cable. A wall portion partially defines the opening in the base, the wall portion having first and second sides. A first leg extends from the first side of the wall portion at the opening and a second leg extends from the second side edge of the wall portion, and the first leg includes an angled tab extending toward the base on a side of the first leg opposite the second leg.

BRIEF DESCRIPTION OF THE DRAWINGS

These and other aspects and features of the invention will be better understood after a reading of the following detailed description together with the attached drawings wherein.

DETAILED DESCRIPTION

Figure 1:
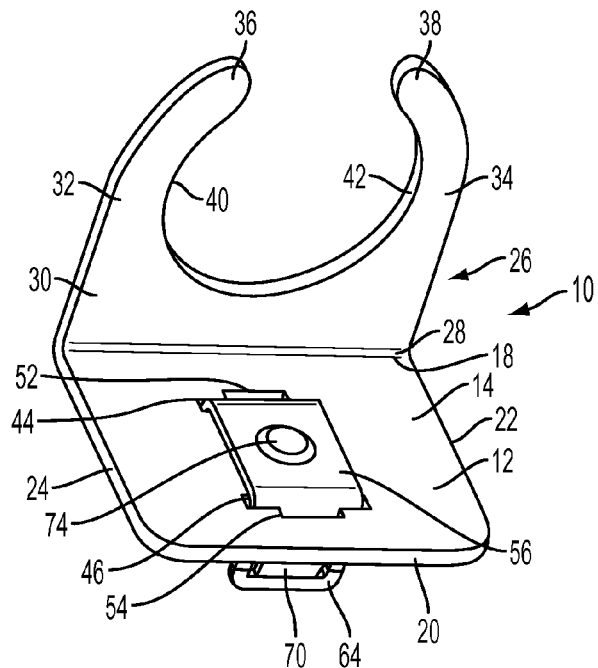
FIG. 1 is a top perspective view of a bracket comprising a base and a clip according to a first embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a bracket 10 according to a first embodiment of the invention that includes a base 12 having a first face 14 and a second face 16 opposite the first face 14, a first side edge 18, a second side edge 20, a top edge 22 and a bottom edge 24. A connector 26 extends generally perpendicularly from the base 12 along the first side edge 18 and connects to the base 12 at a junction 28. The junction 28 could be a weld or other attachment arrangement if the base 12 and the connector 26 are formed from separate elements or may represent a region where the base 12 and the connector 26 meet when the bracket 10 is integrally formed from sheet metal or is molded from metal or plastic.

The connector 26 includes a wall 30 that extends from the junction 28 and a first arm 32 and a second arm 34 that extend from the wall 30. Wall 30 and the first and second arms 32, 34 are all generally perpendicular to base 12. However, the connector 26 could be mounted at an angle other than 90 degrees to the base 12. Furthermore, the wall 30 does not have to run parallel to the first side edge 18 of the base 12 as illustrated. The connector 26 is configured to secure cabling, e.g., a cable or cable bundle (not illustrated), to the bracket 10, and the first arm 32 has an end 36 and the second arm 34 has an end 38 spaced from the end 36 of the first arm 32 to define a space through which a cable or cable bundle may pass. The first arm 32 includes an arcuate inner edge 40 and the second arm 34 includes an arcuate inner edge 42 facing the first arm arcuate inner edge 40 to partially define an aperture for holding the cabling.

Figure 2:
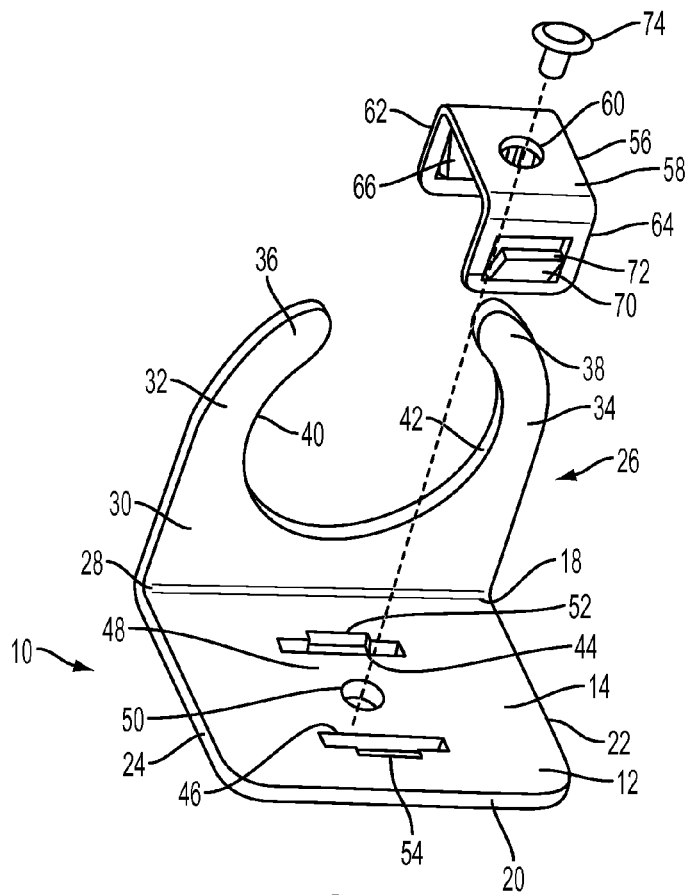
FIG. 2 is an exploded top perspective view of the bracket of FIG. 1.

Referring now to FIG. 2, the base 12 further includes a first opening or slot 44 and a second opening or slot 46 spaced from the first slot 44 by a wall portion 48. The wall portion 48 may also include a hole 50 for accommodating a fastener, discussed below. The first slot 44 includes a notch 52 in a central portion thereof that provides the first slot 44 with a greater width in its central portion. The second slot 46 also includes a notch 54 in a central portion thereof that provides the second slot 44 with a greater width in its central portion. The notch 52 in the first slot 44 is on the side of the first slot 44 closest to the first side edge 18 of the base 12, and the notch 54 in the second slot 46 is on the side of the second slot 46 closest to the second side edge 20; in other words, the notches 52 and 54 face in opposite directions.

Figure 3:
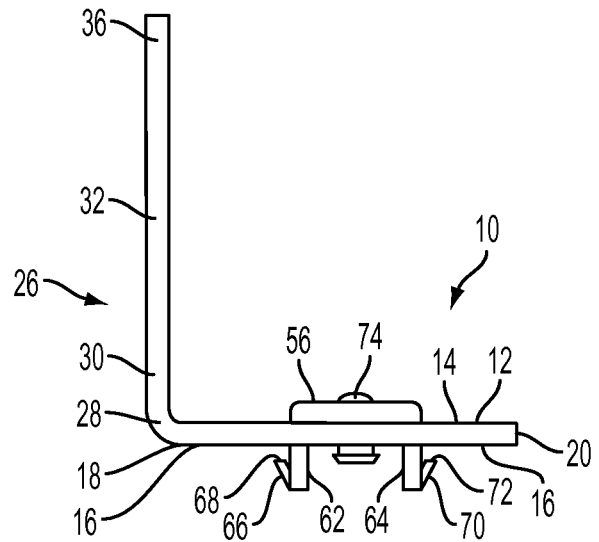
FIG. 3 is side elevational view of the bracket of FIG. 1.
Figure 4:
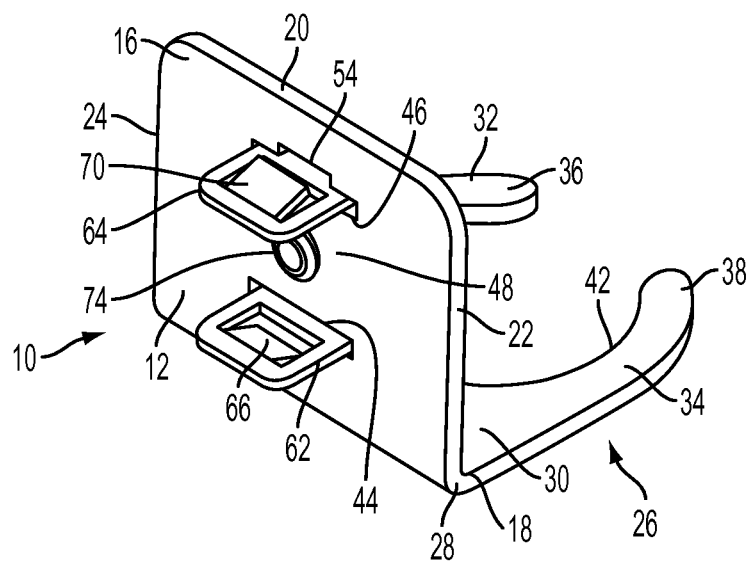
FIG. 4 is a bottom perspective view of the bracket of FIG. 1.

The bracket 10 also includes a clip 56 for securing the base 12 and the connector 26 to a wall element 202 of a support 200 illustrated in FIGS. 9 and 10 and described hereinafter. The clip 56 includes a body 58 having a hole 60 and a first leg 62 and a second leg 64 generally parallel to the first leg 62 projecting to the same side of the body 58. The first leg 62 includes a first tab 66 which may be formed by punching out a central portion of the first leg 62 so that the first tab 66 remains joined to the first leg 62 near the distal end of the first leg 62 and so that the first tab 62 has a free end 68 directed toward the plane of the clip body 58 as illustrated in FIGS. 3 and 4. The second leg 64 includes a second tab 70, which may be formed in the same manner as the first tab 66, which second tab 70 has a free end 72 directed toward the plane of the clip body 58.

The clip 56 is attached to the body 12 by passing the first and second legs 62, 64 of the clip 56 through the first and second slots 44, 46 from the direction of the first face 14 of the clip body 12, the first and second notches 52, 54 in the first and second slots 44, 46 allowing the projecting first and second tabs 66, 70 of the first and second legs 62, 64 to pass through the first and second slots 44, 46 little or no deformation. A rivet 74 or other fastener extends through the hole 60 in the clip body 58 and the hole 50 in the wall portion 48 to secure the clip 56 to the base 12 with the clip body 58 overlying the wall portion 48 of the base 12 on first face 14 of the base 12. The same clip 56 can be used on brackets having different bodies and/or connectors. This allows for the production of many identical clips for use with brackets having different configurations.

Figure 9:
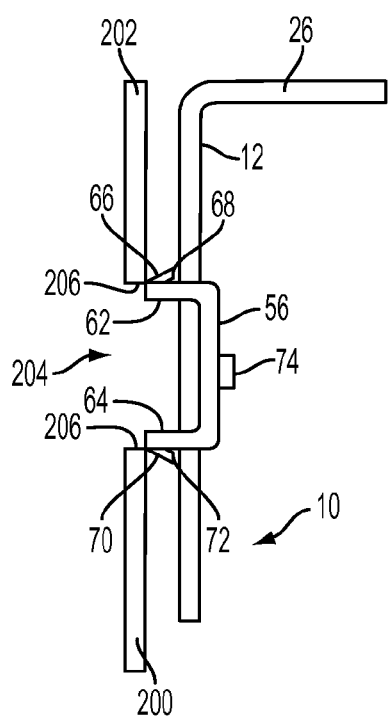
FIGS. 9 and 10 are side elevational views illustrating the attachment of a bracket according to the first through third embodiments to a support.
Figure 10:
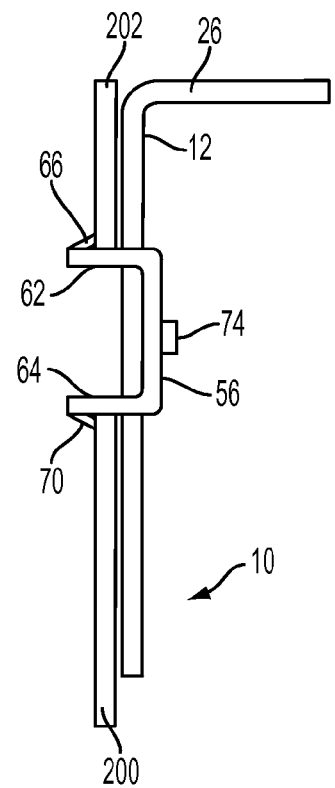

FIGS. 9 and 10 illustrate a wall element 202 of a support 200, such as a rack, that includes a plurality of openings 204, one of which is shown. The openings 204 each have first and second opposite edges 206, and the clip 56 is sized so that the distance between the outer faces of the first and second legs 62, 64 is approximately equal to the distance between the first and second opposite edges 206. To install the bracket 10 on the support 200, the bracket 10 with the clip 56 attached, is moved toward one of the openings 204 so that the distal ends of the first and second legs 62, 64 extend into the opening 204. The bracket 10 and clip 56 are then pressed against the wall element 202 to force the first and second legs 62, 64 into the opening 204, flexing the first and second tabs 66, 70 toward the planes of the first and second legs 62, 64 in the process. When the first tab free end 68 and the second tab free end 72 are through the opening 104, the resiliency of the material forming the first and second tabs 66, 70 causes the tabs 66, 70 to spring back to or toward their original configuration, projecting away from each other and away from the first and second tabs 66, 70.

The first and second tabs 66, 70 are formed so that the free end 68 of the first tab 66 and the free end 72 of the second tab 70 are spaced from the second face 16 of the base 12 by a distance approximately equal to a thickness of the support 202 near the opening 204 so that the first and second free ends 68, 72 engage the side of the support 202 opposite from the side of the support 202 against which the second face 16 of the bracket 10 is mounted. Clips having different sized gaps between the ends of the tabs and the second face 14 of the base 12 can be provided for mounting similar bodies 12 to supports having different thicknesses. Cables or cable bundles (not illustrated) can be placed into the opening between the first and second arms 32, 34 either before or after the bracket 10 is secured to the support 200. This arrangement allows for the tool-less installation of brackets 10. The brackets 10 can also be removed, with or without a tool, by compressing the first and second tabs 66, 70 toward one another and pulling the first and second legs 62, 64 through the opening 204 in the opposite direction from which the legs were installed.

Figure 5:
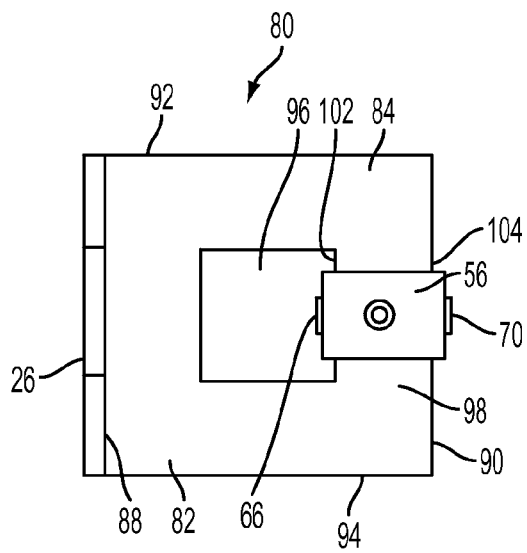
FIG. 5 is a top plan view of a bracket according to a second embodiment of the invention.
Figure 6:
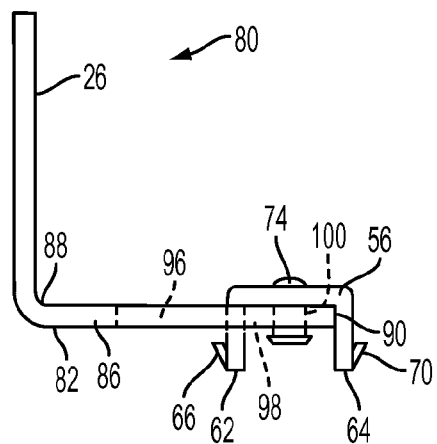
FIG. 6 is a side elevational view of the bracket of FIG. 5.

A second embodiment of a bracket is illustrated in FIGS. 5 and 6, and the reference numerals used in the first embodiment are used to identify elements common to this embodiment. A bracket 80 according to this embodiment includes a connector 26 and a clip 56 as in the first embodiment, but bracket 80 has a modified base 82. The base 82 has a first face 84 and a second face 86 opposite the first face 84, a first side edge 88, a second side edge 90, a top edge 92 and a bottom edge 94. The base 12 further includes a single central opening 96 that is at least as wide in the direction between the top edge 92 and the bottom edge 94 as the width of the clip 56 parallel to the first and second legs 62, 64 and at least as wide in the direction between first side edge 88 and the second side edge 90 as a width of the first leg 62 and first tab 66 so that the first leg 62 of the bracket 80 can pass through the central opening 96.

Bracket 80 includes a wall portion 98 on the side of central opening 96 opposite the connector 26 having a hole 100, and wall portion 98 includes a first side 102 which defines a first side of the central opening 96 and a second side 104 which comprises a central portion of the second side edge 90 of the base 82. The distance between the first side 102 and the second side 104 of the wall portion 98 is approximately the same as the distance between the inner portions of the first leg 62 and the second leg 64 of the clip 56 so that the clip 56 can straddle the wall portion 98. A rivet 74 extends through the hole 60 in the body 58 of the clip 56 and through the hole 100 in the wall portion 98 to connect the clip 56 to the wall portion 98 and thus to the base 82. The bracket 80 mounts to an opening 204 in the support 202 in the same manner as the bracket 10 of the first embodiment.

Figure 7:
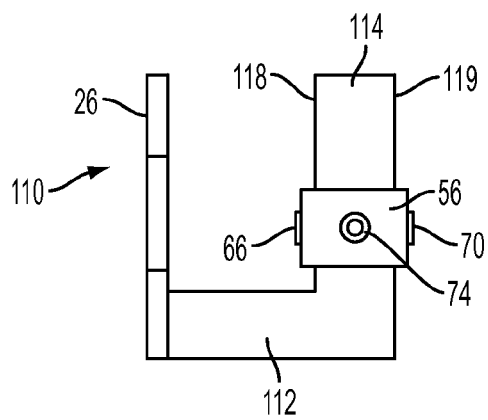
FIG. 7 is a top plan view of a bracket according to a third embodiment of the present invention.
Figure 8:
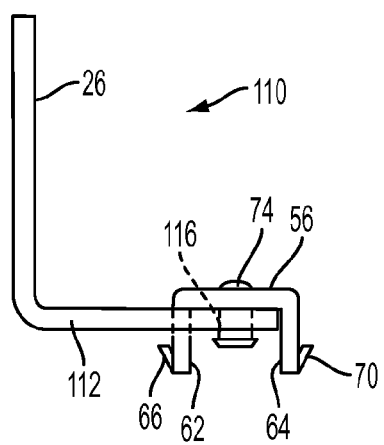
FIG. 8 is a side elevational view of the bracket of FIG. 7.

FIGS. 7 and 8 illustrate a third embodiment in which reference numerals from the foregoing embodiments are used to identify elements common to the third embodiment. A bracket 110 according to this embodiment includes a connector 26 and a clip 56 as in the first and second embodiments. However, in this embodiment, the bracket 110 includes an L-shaped body 112 that projects from the wall 30 of the connector 26 which body 112 includes a wall portion 114 generally parallel to the connector 26 and that has a hole 116. The wall portion 114 includes a first side 118 facing the connector 26 and a second side 119 opposite the first side. An opening or channel is formed between the first side 118 and the connector 26. The distance between the first side 118 and the second side 119 of the wall portion 114 is approximately the same as the distance between the inner portions of the first leg 62 and the second leg 64 of the clip 56 so that the clip 56 can straddle the wall portion 114, and a rivet 74 extends through the hole 60 in the body 58 of the clip 56 and through the hole 116 in the wall portion 114 to connect the clip 56 to the wall portion 114 and thus to the bracket 110. The bracket 110 mounts to an opening 204 in support 202 in the same manner as brackets 10 and 80 of the first and second embodiments.

Figure 11:
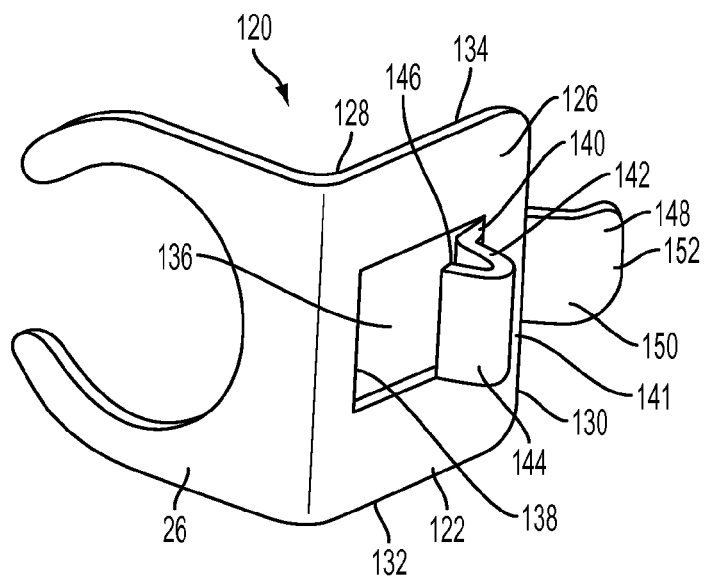
FIG. 11 is a bottom perspective view of a bracket according to a fourth embodiment of the present invention.
Figure 12:
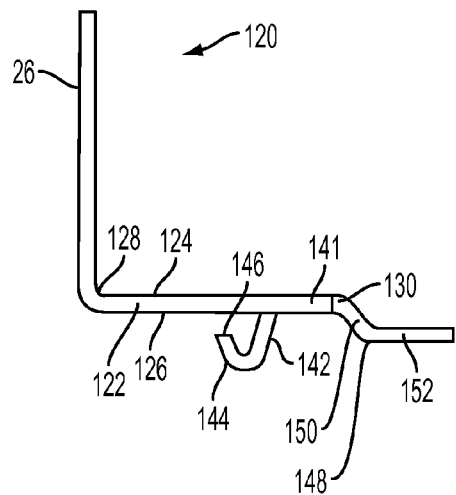
FIG. 12 is a side elevational view of the bracket of FIG. 11.

FIGS. 11 and 12 illustrate a fourth embodiment of the invention in which reference numerals from the above-described embodiments are used to identify elements common to this embodiment. A bracket 120 according to this embodiment includes a connector 26 extending from a square or rectangular base 122 having a first face 124 and a second face 126 opposite the first face 124, a first side edge 128, a second side edge 130, a top edge 132 and a bottom edge 134. Base 122 further includes a single central opening 136 having a first inner edge 138 near the first side edge 128 of the base and a second inner edge 140 between the first inner edge 138 and the second side edge 130 of the base 122. A wall portion 141 is formed between the second inner edge 140 and the second side edge 130 of the base. A first leg 142 projects from the second inner edge 140 on the second face side of the base 122 and extends generally under the central opening 136 and includes a hooked end 144 having a leg end or tab 146. A second leg 148 extends from the second side edge 130 of the base 122 on the second face side of the base 122 and includes a sloped portion 150 and an extension or tab 152.

Figure 15:
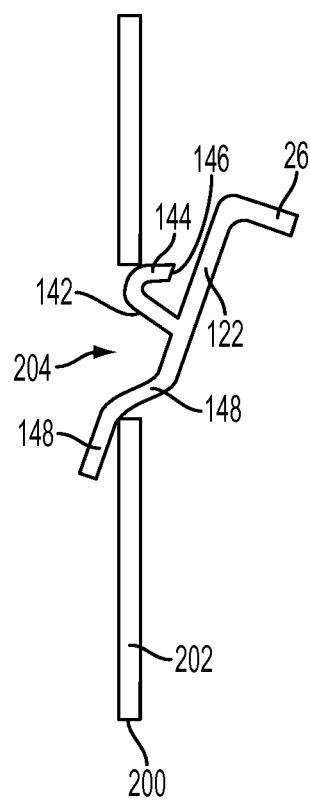
FIGS. 15 and 16 are side elevational views illustrating the attachment of a bracket according to the fourth and fifth embodiments to a support.
Figure 16:
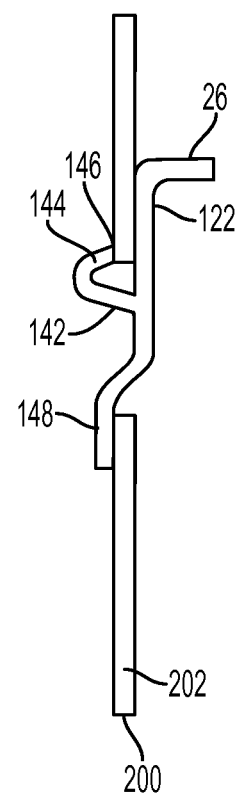

FIGS. 15 and 16 illustrate the mounting of the bracket 120 in an opening 204 of the support member 202. To mount the bracket 120, the extension or tab 152 of the second leg 148 is inserted into an opening 204 in the support member 202 so that it extends along the side of support member 202 opposite the side of the support member 202 from which the second leg 148 was inserted until the sloped portion 150 engages one of the edges 206 of the opening 204. The base 122 of the bracket 120 is then moved toward the support member 202 until the hooked end 144 of the first leg 142 engages a side of the opening 204. The bracket 120 is pressed toward the opening 204 to deform the hooked end 144 of the first leg 142 to allow it to pass through the opening 204. The first leg 142 returns to its original shape after the leg end or tab 146 of the first leg 142 clears the opening 204 and comes to rest against the side of the support member 202 opposite from the base 122 of the bracket 120.

Figure 13:
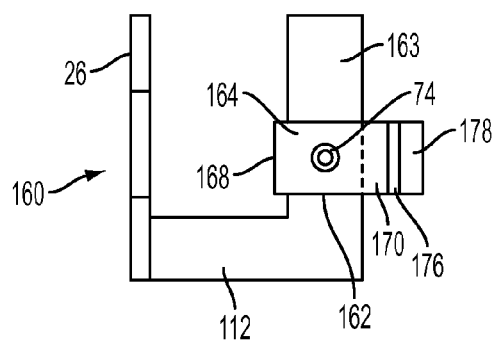
FIG. 13 is a top plan view of a bracket according to a fifth embodiment of the present invention.
Figure 14:
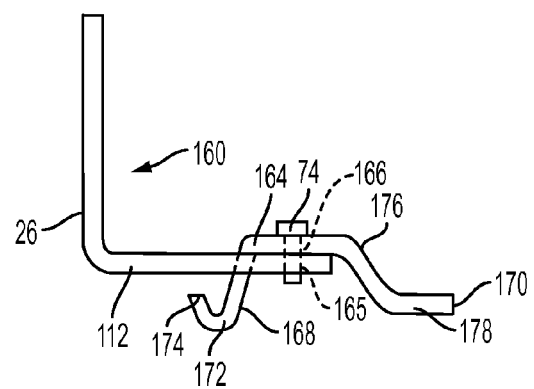
FIG. 14 is a side elevational view of the bracket of FIG. 13.

FIGS. 13 and 14 illustrate a fifth embodiment of the invention in which reference numerals from the above embodiments are used to identify elements common to this embodiment. A bracket 160 according to this embodiment includes a connector 26 identical to the connectors of the previous embodiments and an L-shaped body 112 substantially identical to the L-shaped body 112 of the third embodiment illustrated in FIGS. 7 and 8 but which has a modified wall portion as described below. In this embodiment, a clip 162 is used instead of the clip 56 of the third embodiment. As described below, the clip 162 has a structure that resembles the structure of the first leg 142 and second leg 146 of the fifth embodiment, illustrated in FIGS. 11 and 12, but clip 162 comprises a separate element connected to a wall portion 163 with a hole 165 therethrough.

The clip 162 comprises a body 164 having a hole 166 and a first leg 168 extending from a first side of the body 164 and a second leg 170 extending from a second side of the body 164 opposite the first leg 168. The first leg 168 includes a hooked end 172 and a leg end or tab 174, and the second leg 170 includes a sloped portion 176 and an extension or tab 178. The clip 162 is mounted on the wall portion 163 by aligning the hole 166 on the body 164 of the clip 162 with the hole 165 on the wall portion 163 and positioning the clip 162 so that the first leg 168 is located on the side of the wall portion 163 closest to the connector 26 and passing the rivet 74 through the aligned holes. With the clip 162 connected to the L-shaped body 112, the bracket 160 can be mounted to a support 200 as described above in connection with the fourth embodiment.

The present invention has been described herein in terms of several presently preferred embodiments. However, modifications and additions to these embodiments will become apparent to those of ordinary skill in the relevant art upon a reading of the foregoing description. It is intended that all such modifications and additions comprise a part of the present invention to the extent that they fall within the scope of the several claims appended hereto.

We claim:

1. A bracket comprising:
   a base having a first face and a second face and at least one side edge between the first face and the second face;
   a connector projecting from the first face of the base, the connector configured to support a cable;
   at least one opening extending through the base and a wall portion formed on the base and being located adjacent the at least one opening; and
   a clip, formed as a separate element from said connector, comprising a body and first and second legs projecting from the body, each of the first and second legs including a tab, the tab of the first leg projecting away from the tab of the second leg, the clip being mounted on the base with the first leg projecting through the at least one opening and a portion of the body residing between the first and second legs overlying and contacting the wall portion of the base.

2. The bracket of claim 1, wherein the at least one opening comprises first and second openings and wherein the first leg extends through the first opening and the second leg extends through the second opening.

3. The bracket of claim 2 wherein the first and second openings comprise first and second slots.

4. The bracket of claim 2, wherein the clip is connected to the wall portion of the base by a fastener.

5. The bracket of claim 1, wherein the connector projects from a first side of the first face and includes a first arm having a first arm end and a first arm arcuate inner edge and a second arm having a second arm end spaced from the first arm end and a second arm arcuate inner edge facing the first arm arcuate inner edge.

6. The bracket of claim 5, wherein the first and second arms are substantially perpendicular to the base.

7. The bracket of claim 2 wherein the first and second openings comprise first and second slots, each of the first and second slots having a first end and a second end, a length between the first end and the second end, a width, a slot central portion spaced from the first end and the second end, and first and second slot end portions between the slot central portion and each of the first and second slot ends, wherein a width of the slot central portion is greater than a width of the slot end portions.

8. A bracket comprising:
   a base having a first face and a second face and at least one side edge between the first face and the second face;
   a connector projecting from the base, the connector configured to support a cable;
   at least one opening extending through the base and a wall portion adjacent the at least one opening; and
   a clip comprising a body and first and second legs projecting from the body, each of the first and second legs including a tab, the tab of the first leg projecting away from the tab of the second leg, the clip being mounted on the base with the first leg projecting through the at least one opening and the body overlying the wall portion, wherein the at least one opening comprises first and second openings and wherein the first leg extends through the first opening and the second leg extends through the second opening,
   wherein the first and second openings comprise first and second slots, each of the first and second slots having a first end and a second end, a length between the first end and the second end and a slot central portion spaced from the first end and the second end, the slot central portions each including a notch, the notch of the first slot central portion and the notch of the second slot central portion facing away from each other.

9. The bracket of claim 1, wherein the connector comprises a wall projecting perpendicularly from the base and having a C-shaped aperture for at least partially encircling a cable.

10. The bracket of claim 1, wherein,
    the at least one side edge comprises a top edge, a bottom edge and first and second side edges between the top edge and the bottom edge,
    the connector comprises a wall projecting perpendicularly from the base at the first side edge and first and second arms projecting from the wall, the first and second arms having spaced apart ends and defining an arcuate opening in a plane perpendicular to the base,
    the at least one opening comprises first and second slots parallel to the first and second side edges, the first and second slots each having a first end and a second end, a length between the first end and the second end, and a width, the first slot being located between the second slot and the first side edge, the first slot including a notch directed toward the first side edge and the second slot including a notch directed toward the second side edge,
    the body is connected to the wall portion by a fastener, and
    the tab on the first leg comprises a bent portion of the first leg and the tab on the second leg comprise a bent portion of the second leg.

11. The bracket of claim 1 wherein the body and the connector are formed from a unitary piece of metal.

12. The bracket of claim 1 wherein the body and the connector are formed from a unitary molded plastic element.

13. A bracket comprising:
    a base having a first face and a second face, a top edge, a bottom edge, a side edge and an opening;
    a connector projecting from the first face of the base and having an aperture configured to support a cable;
    a wall portion formed on the base and along one side of the opening, the wall portion having a first side and a second side opposite the first side;
    a first leg extending from the first side of the wall portion through the opening away from the second face of the base; and
    a second leg extending from the second side of the wall portion away from the second face of the base,
    wherein the first leg includes an angled tab extending toward the second face of the base on a side of the first leg opposite the second leg, wherein a free end of the angled tab is spaced from the second face of the base.

14. The bracket of claim 13, wherein the second leg includes an angled tab extending toward the second face of the base on a side of the second leg opposite the first leg.

15. The bracket of claim 13, wherein the second side of the wall portion comprises the side edge of the base.

16. The bracket of claim 15, where the second leg includes a portion lying in a plane substantially parallel to the base.

* * * * *